(12) United States Patent
Yamakawa et al.

(10) Patent No.: US 7,702,865 B2
(45) Date of Patent: Apr. 20, 2010

(54) STORAGE SYSTEM AND DATA MIGRATION METHOD

(75) Inventors: Hiroshi Yamakawa, Kawasaki (JP); Mikihiko Tokunaga, Fujisawa (JP); Shoichi Fukumoto, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1008 days.

(21) Appl. No.: 11/330,219

(22) Filed: Jan. 12, 2006

(65) Prior Publication Data
US 2007/0118710 A1 May 24, 2007

(30) Foreign Application Priority Data
Nov. 18, 2005 (JP) ............................. 2005-334028

(51) Int. Cl.
*G06F 13/00* (2006.01)
(52) U.S. Cl. .................. 711/162; 711/154; 711/161; 711/165
(58) Field of Classification Search ................. 711/165, 711/154, 161, 162
See application file for complete search history.

(56) References Cited

U.S. PATENT DOCUMENTS 7,415,593 B2 * 8/2008 Mashima et al. ............ 711/203

2004/0199526 A1 * 10/2004 Nishikawa et al. .......... 707/100

FOREIGN PATENT DOCUMENTS

| JP | 2004-139494 | 5/2004 |
| JP | 2004-334561 | 11/2004 |

\* cited by examiner

*Primary Examiner*—Mardochee Chery
(74) *Attorney, Agent, or Firm*—Antonelli, Terry, Stout & Kraus, LLP.

(57) ABSTRACT

A storage system and a data migration method that enable most suitable data migration with the correlation between data managed by particular applications being taken into account. The above storage system and data migration method are configured to collect operational information for each volume; respectively calculate a required volume performance level that is a level of performance required of the volume storing data that is a migration target, and an actual volume performance level that is a level of performance for each volume established in a storage apparatus, based on the collected information; and, in accordance with the calculated required volume performance level and each of the actual volume performance levels, when necessary, migrate the data that is a migration target to another volume having an actual volume performance level corresponding to the required volume performance level of the volume storing that data.

4 Claims, 8 Drawing Sheets

| APPLICATION NAME | DATA NAME | STATISTICAL INFORMATION | | | REQUIRED LEVEL | USED VOLUME |
|---|---|---|---|---|---|---|
| | | I/O (read) | I/O (write) | RESPONSE TIME | | |
| 1 | a | 90 | 10 | | 100 | 1:01 |
| 1 | b | 20 | 40 | | 60 | 1:02 |
| 1 | c | 9 | 1 | | 10 | 1:03 |

| VOLUME NUMBER | ACTUAL VOLUME PERFORMANCE LEVEL |
|---|---|
| 8:0A | 100 |
| 8:0B | 80 |
| 8:0C | 70 |
| 8:0D | 20 |
| 8:0E | 10 |
| 1:01 | 20 |
| 1:02 | 10 |
| 1:03 | 5 |

| APPLICATION NAME | TABLE NAME | VOLUME NUMBER |
|---|---|---|
| app 1 | tbl11 | 0:3C |
| app 1 | tbl12 | 5:44 |
| app 2 | tbl21 | 0:32 |
| app 2 | tbl22 | 1:12 |

FIG.7

| APPLICATION NAME | START TIME | VOLUME NUMBER |
|---|---|---|
| app 1 | 8:00 | 0:3C |
| app 1 | 8:30 | 5:44 |
| app 2 | 12:00 | 0:32 |
| app 2 | 12:05 | 1:12 |

FIG.8

| ACCESS TIME | I/O (WRITE) AMOUNT | I/O (READ) AMOUNT | VOLUME NUMBER |
|---|---|---|---|
| 8:00:00 001 | 10 | 11 | 0:3C |
| 8:00:00 839 | 50 | 9 | 5:44 |
| 8:00:01 102 | 39 | 33 | 5:43 |
| 8:00:40 010 | 10 | 71 | 0:3C |
| 8:00:40 525 | 50 | 21 | 5:44 |
| 8:03:42 429 | 801 | 103 | 5:42 |
| 8:04:00 001 | 10 | 11 | 0:3C |
| 8:04:00 839 | 50 | 9 | 5:44 |
| 8:05:00 001 | 10 | 11 | 0:3C |
| 8:05:00 839 | 50 | 9 | 5:44 |
| 8:08:00 011 | 10 | 11 | 0:3C |
| 8:08:00 819 | 50 | 9 | 5:44 |

| SOURCE VOLUME | MIGRATION DESTINATION VOLUME |
|---|---|
| LUN2 | LUN5 |
|  | LUN6 |
| LUN3 | LUN7 |
|  | LUN8 |

STORAGE SYSTEM AND DATA MIGRATION METHOD

CROSS-REFERENCES TO RELATED APPLICATIONS

This application relates to and claims priority from Japanese Patent Application No. 2005-334028 filed on Nov. 18, 2005, the entire disclosure of which is incorporated herein by reference.

BACKGROUND OF THE INVENTION

The present invention relates to a storage system and a data migration method. This invention is suitable for, for example, a storage system using a tiered storage apparatus as a storage apparatus.

Lately, large-capacity storage apparatuses equipped with low-cost storage devices such as SATA (Serial AT Attachment) disks have been introduced onto the market, and storage resource characteristics, such as cost and quality, have been diversified. With the emergence of these low-price storage apparatuses, not only conventional storage solutions for online data, but in addition new ones directed at compliance related markets, for example data archival, etc., have been coming on to the market. So, there has been an urgent need to integrate multiple SAN (Storage Area Network) environments and utilize various different storage resources efficiently and effectively.

Meanwhile, data lifecycle management (DLCM) has been receiving attention lately, and in light of reducing storage management costs, high emphasis is being placed on relocating data to the most suitable storage resource according to data priorities that change over time, and supporting data migration in each DLCM phase between volumes in a storage apparatus.

As a conventional method for allocating the most suitable volume in data migration, for example, JP-A-2004-334561 has introduced a method for managing each volume's actual performance (such as response speed to data input/output requests) and the volume performance required by each application, and in data migration, allocating the data migration target volume that is most suitable for each application. Also, JP-A-2002-305415 has introduced a method for acquiring statistical operational information on volumes used by an application and providing that information to a user, and by utilizing this technique, a user can select a data migration target volume based on that statistical operational information.

SUMMARY OF THE INVENTION

However, the above conventional methods have problems in that although respective data can be migrated with their relationship with the corresponding application being maintained, it is not necessarily possible to allocate the most suitable destination volume when the correlation between data managed by particular applications is taken into account.

More specifically, if an application uses different volumes for different types of data, the application normally does not require a uniform level of performance from all the volumes, but different levels of performance from different volumes according to the purpose of those volumes. For example, in the case of a database application, while a volume for storing log data is required to be a volume that ensures a high access speed and high reliability, i.e., a high performance level required, a volume for storing data is normally required to be a volume that does not ensure such high access speed, etc., but instead has a large capacity for storing large amounts of data, i.e., a low performance level required.

However, as stated above, in the conventional methods, the correlation between data managed by particular applications is not considered. Accordingly, if data is migrated using conventional methods, a high-performance-level volume may not be allocated as a volume for storing log data, and a volume with a low performance level and large capacity may not be allocated as a volume for storing data.

Furthermore, in the case of a Web application system where a plurality of files that are accessed with different frequencies are stored in the same volume, when migrating a frequently-accessed file and an infrequently-accessed file respectively to different volumes, it is necessary to migrate the former to a volume with a higher level of performance compared to the latter, but conventional methods can not ensure such migration.

As stated above, the conventional methods have the problems of being incapable of migrating data with the correlation between data managed by particular applications being taken into account, even when such migration is necessary, and as a result, most suitable data migration is impossible.

Accordingly, an object of this invention is to provide a storage system and a data migration method enabling most suitable data migration with the correlation between data managed by particular applications being taken into account.

In order to solve the above-described problems, this invention provides a storage system with a storage apparatus having a plurality of volumes for storing data, and a management apparatus managing the storage apparatus; the storage apparatus comprising a controller for collecting operational information for each of the volumes and sending that information to the management apparatus; the management apparatus comprising a control unit for controlling the storage apparatus, when necessary, in a manner where any of the data that is a migration target is respectively migrated to another of the volumes, based on the operational information for each of the volumes; and the control unit in the management apparatus respectively calculating a required volume performance level that is a level of performance required of the volume storing the data that is a migration target, and an actual volume performance level that is a level of performance for each of the volumes established in the storage apparatus, based on the operational information for each of the volumes, and in accordance with the calculated required volume performance level and each of the actual volume performance levels, migrating the data that is a migration target to another of the volumes having an actual volume performance level corresponding to the required volume performance level of the volume storing that data.

Accordingly, in this storage system, it is possible to migrate migration target data to a volume having an actual volume performance level corresponding to the required volume performance level of the volume storing that target data.

This invention also provides a method for migrating data between a plurality of volumes storing the data, including the steps of: collecting operational information for each of the volumes; respectively calculating a required volume performance level that is a level of performance required of the volume storing the data that is a migration target, and an actual volume performance level that is a level of performance for each of the volumes established in a storage apparatus, based on the operational information for each of the volumes; and, in accordance with the calculated required volume performance level and each of the actual volume performance levels, when necessary, migrating the data that is a migration target to another of the volumes having an actual volume performance level corresponding to the required volume performance level of the volume storing that data.

Accordingly, with the above data migration method, it is possible to migrate migration target data to a volume having an actual volume performance level corresponding to the required volume performance level of the volume storing that target data.

This invention further provides a data migration method including: determining a required performance with respect to data stored in one or more source volumes having relevance; determining correlation between the one or more source volumes having relevance, based on the required performance; and designating one or more migration target volumes based on the obtained correlation and migrating data to the one or more designated volumes.

Accordingly, with the above data migration method, it is possible to migrate migration target data to a volume having an actual volume performance level corresponding to the required volume performance level of the volume storing that target data.

According to this invention, a storage system and a data migration method enabling most suitable data migration with the correlation between data managed by particular applications being taken into account can be realized.

DETAILED DESCRIPTION OF THE INVENTION

An embodiment of this invention is described below in detail with reference to the attached drawings.

(1) Storage System Configuration According to this Embodiment

Figure 1:
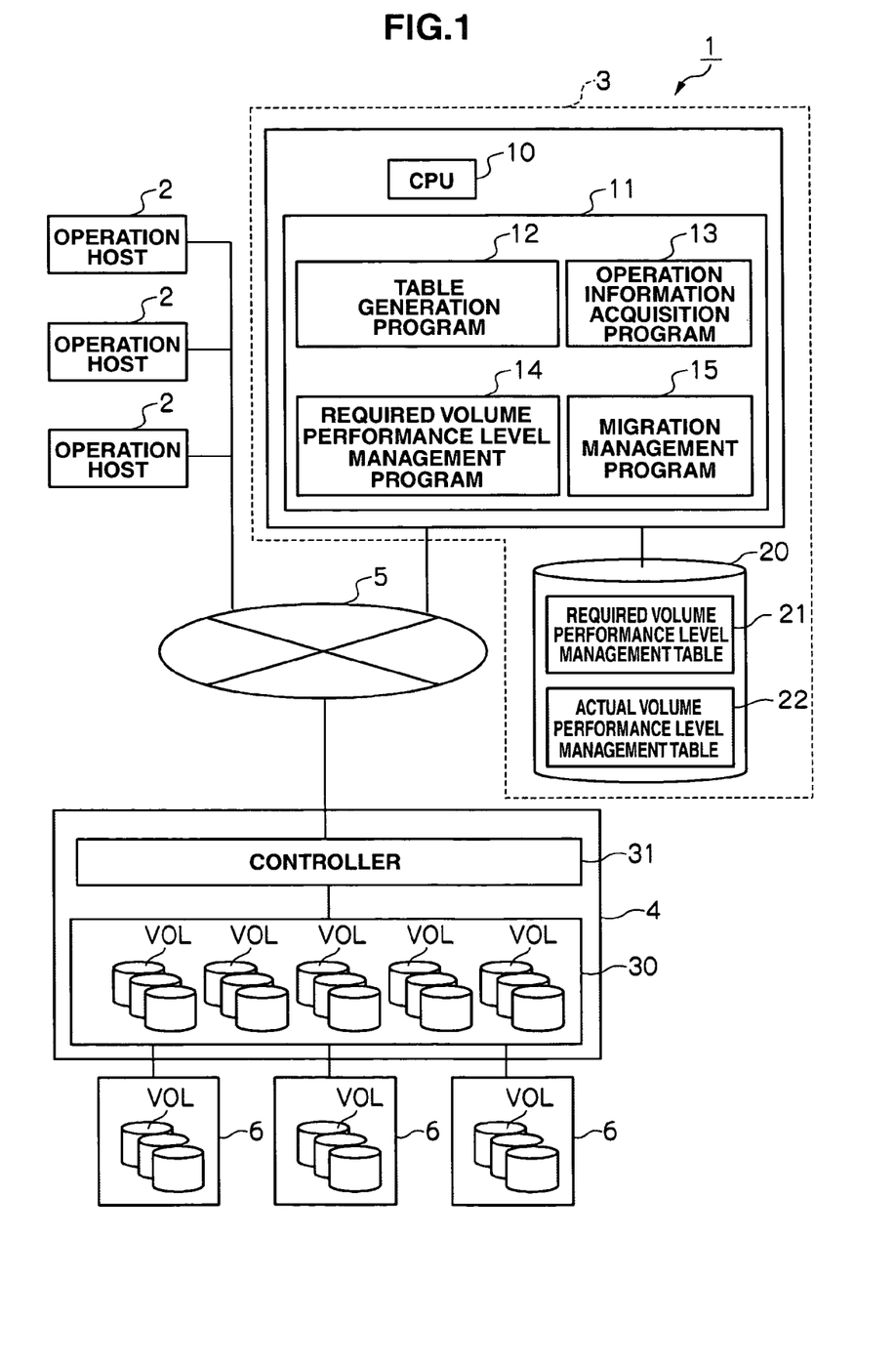
FIG. 1 is a block diagram showing the storage system configuration according to this embodiment.

In FIG. 1, a storage system 1 shows the entire system according to this embodiment. This storage system 1 is configured to include a plurality of operation hosts 2, at least one management host 3, and a tiered storage apparatus 4, all interconnected via a network 5, and to further include one or more external storage apparatuses 6 connected to the tiered storage apparatus 4.

Each operation host 2 is a server for a user to use [for business, etc.,] and is configured to have a CPU (Central Processing Unit), a memory, etc. The CPU in each operation host 2 executes various control programs and applications, realizing various functions.

The operation hosts 2 can input/output data to/from the tiered storage apparatus 4 via the network 5. Examples of the network 5 include a LAN, a SAN, the internet, a lease line, a public line, and others, and those can be used arbitrarily case by case. Communication between the operation hosts 2 and the tiered storage apparatus 4 via the network 5 is based on, for example, Fibre Channel Protocol when the network 5 is a SAN, or TCP/IP (Transmission Control Protocol/Internet Protocol) when the network 5 is a LAN.

The management host 3 is a server for managing and monitoring the tiered storage apparatus 4 connected to the network 5, and is configured to have a CPU 10, a memory 11, etc. The memory 11 stores various control programs and application software, and by the CPU 10 executing the control programs and application software, various processing is carried out, including control processing for the management and monitoring of the tiered storage apparatus 4. This memory 11 also stores and holds a table generation program 12, an operational information acquisition program 13, a required volume performance level monitoring program 14 and a migration management program 15, all explained later.

The management host 3 also has a local disk device 20 composed of a hard disk device or similar, and various data is stored in this local disk device 20. A required volume performance level management table 21 and an actual volume performance level management table 22, explained later, are stored and maintained in this local disk device 20 too.

The tiered storage apparatus 4 is composed of a memory device unit 30 having a plurality of disk devices (not shown in the drawing), and a controller 31 controlling the memory device unit 30.

Examples of the disk devices constituting the memory device unit 30 include expensive disks such as SCSI (Small Computer System Interface) disks, and inexpensive disks such as SATA (Serial AT Attachment) disks or optical disks. Also, the disk devices may include both of the above-described expensive and inexpensive disks.

Each disk device in the memory device unit 30 is operated by the controller 31 based on a RAID system. One or more disk devices constitute one RAID group, and one or more logical volumes VOL are established on a physical storage area provided by each RAID group. Data is stored in these volumes in blocks (hereinafter referred to as logical blocks) of a predetermined size.

Each logical volume VOL is given a unique identifier (hereinafter referred to as an LU (Logical Unit number)). In this embodiment, a combination of the above LU and a unique number given to each logical block (LBA: Logical Block Address) constitutes one address, and data input/output is executed using that address.

The controller 31 virtualizes volumes VOL within the connected external storage apparatuses 6 to supply them to the operation hosts 2, and controls the volumes VOL in its own storage apparatus and the volumes VOL in the external storage apparatuses 6, in an integrated manner. Accordingly, the operation hosts 2 can access a volume VOL, without knowing whether it is in the tiered storage apparatus 4 or in the external storage apparatuses 6. Also, the controller 31 can arbitrarily connect or separate the external storage apparatuses 6, and furthermore can perform data migration between the volumes VOL.

The external storage apparatuses 6 are composed of, for example, disk array devices. A plurality of memory devices (referred to as disk devices below) are placed in each external storage apparatus 6. Disk devices utilized as the above disk devices are normally disk devices with inferior performance compared to the disk devices in the tiered storage apparatus 4. One or more volumes VOL are established on a physical storage area provided by each RAID group composed of one or more disk devices, and these volumes VOL are virtualized by the tiered storage apparatus 4, and supplied to the operation hosts 2, as described above.

(2) Data Migration Function in the Storage System 1

Figure 2:
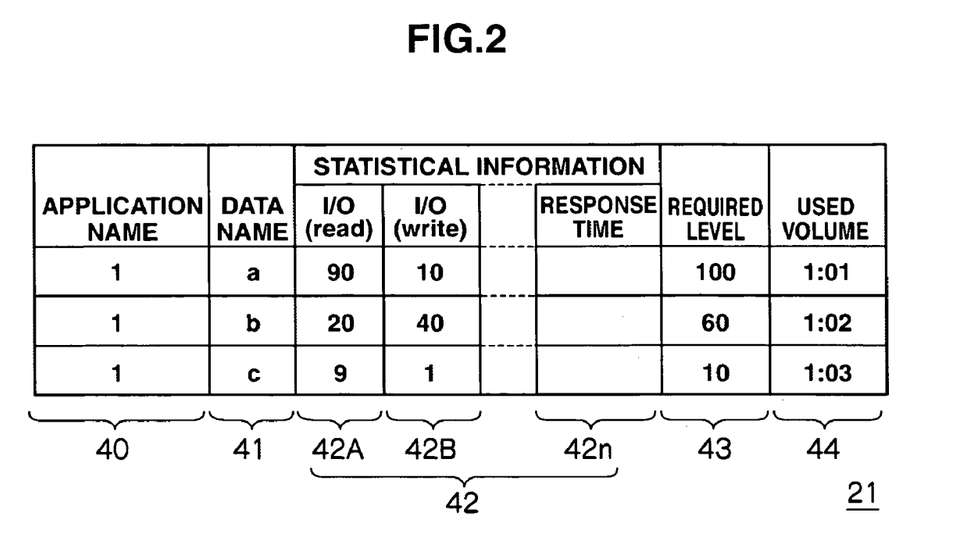
FIG. 2 is a schematic diagram for explaining a required volume performance level management table.

A data migration function provided to the storage system 1 is explained next. FIG. 2 shows a required volume performance level management table 21 stored in the local disk device 20 of the management host 3.

In this embodiment, the controller 31 of the tiered storage apparatus 4 is configured to constantly collect various information indicating the operational status of each volume VOL (hereinafter referred to as operational information), such as the number of inputs/outputs per second or the time required to respond to a data input/output request, concerning the respective volumes VOL established in its own apparatus (and the virtualized volumes VOL in the external storage apparatuses 6 as well) using known techniques, and to send that collected operational information for each volume VOL in sequence to the management host 3. Also, with respect to volumes VOL that have not yet been used and are in an initial state, the controller 31 sends values for the number of data inputs/outputs per second, the time required to respond to a data input/output request, or similar figures, that are theoretically calculated based on the specifications of the disk devices constituting the relevant RAID group providing that volume, to the management host 3 as the operational information.

Then, according to the operational information for each volume VOL sent from the tiered storage apparatus 4, the management host 3 manages a required volume performance level for the respective data—the level required of each volume VOL used by an application as a storage area for the respective data—by using the above-mentioned required volume performance level management table 21. The required volume performance level used herein means the level of response performance that an application requires from each volume VOL for storing the respective data, which differs according to the features of the respective data.

As shown in FIG. 2, the required volume performance level management table 21 is composed of an "Application Name" field 40, a "Data Name" field 41, a "Statistical Information" field 42, a "Required Level" field 43 and a "Used Volume" field 44.

In each entry in this table, identification information on the corresponding application and the name of the corresponding data (e.g., file name) is respectively stored in the "Application Name" field 40 and the "Data Name" field 41, and identification information about the volume VOL where that corresponding data is presently stored (e.g., LUN) is stored in the "Used Volume" field 44.

The "Statistical Information" field 42 is composed of several fields 42A, 42B ..., 42n, each storing a measured value regarding specific factors used for calculating the required volume performance level for respective data, such as the number of data reads and the number of data writes (referred to as required level calculation factors below). So, each entry has in these fields 42A, 42B, ..., 42n, respective values obtained using the operational information for the volume VOL storing the corresponding data, from the operational information for each volume VOL sent from the tiered storage apparatus 4.

Specifically, the "Statistical Information" field 42 includes, for example, a "I/O (Read) Count" field 42A, a "I/O (Write) Count" field 42B, ..., and a "Response Time" field 42n. In the "I/O (Read) Count" field 42A, the number of 'reads' from the corresponding data per second (the number of times that data is read from the corresponding volume VOL) is stored. Also, in the "I/O (Write) Count" field 42B, the number of 'writes' ('updates') to the corresponding data per second (the number of times that data is written (updated) to the corresponding volume VOL) is stored, and in the "Response Time" field 42n, the average value of the response time when the corresponding data is accessed (the response time required for a data input/output request to the corresponding volume VOL) is stored.

Furthermore, in the "Required Level" field 43, the required volume performance level of a volume VOL used as a storage area for the corresponding data is stored. This required volume performance level is calculated according to the following formula.

$$Lr = Cr1 \times Er1 + Cr2 \times Er2 + \ldots + Crn \times Ern \quad (1)$$

In the above formula, $Er1, Er2, \ldots, Ern$ are the respective values stored in the fields 42A, 42B ..., 42n in the "Statistical Information" field 42, and $Cr1, Cr2, \ldots, Crn$ are weighted values for adjusting variation between the respective required level calculation factors, which are normally set as "1." If any of the values obtained according to the operational information for each volume VOL sent from the tiered storage apparatus 4 is a value where, normally, the smaller the value is, the better the performance is, the inverse number of that obtained value is stored in the corresponding field 42A, 42B, ..., or 42n in the "Statistical Information" field 42, and that inverse number is used for calculating formula (1).

Figure 3:
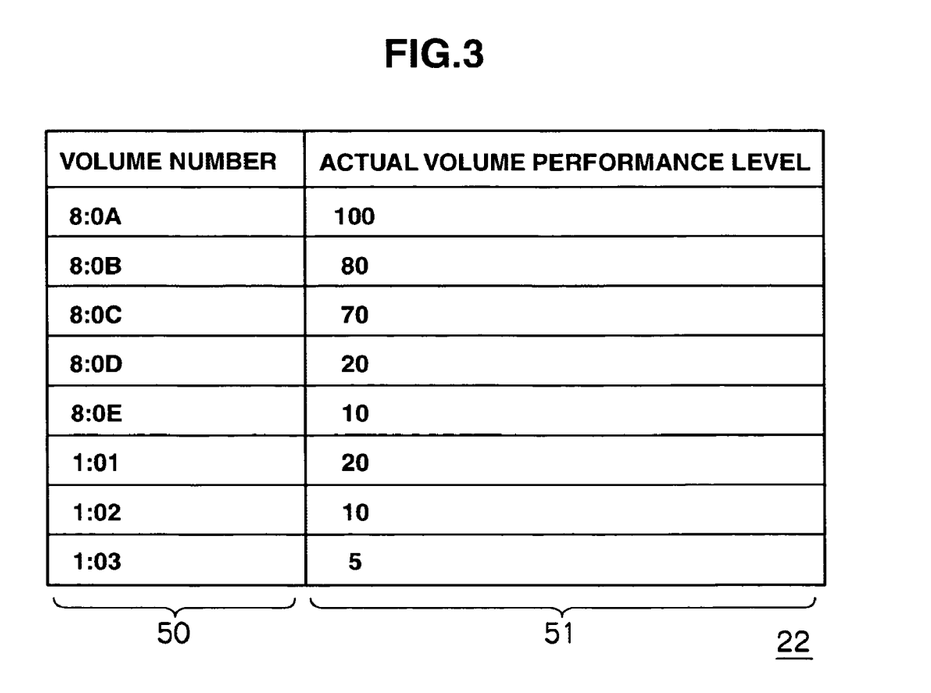
FIG. 3 is a schematic diagram for explaining a actual volume performance level management table.

Meanwhile, FIG. 3 shows the actual volume performance level management table 22 stored in the local disk device 20 of the management host 3. The management host 3 calculates an actual volume performance level for all of the volumes VOL established in the tiered storage apparatus 4 and in the external storage apparatuses 6, referring to the operational information for each volume VOL sent from the tiered storage apparatus 4, and manages the calculated actual volume performance level for each volume VOL, by using the actual volume performance level management table 22. The actual volume performance level means the level of response performance that a volume VOL exhibits to a data input/output request.

As shown in FIG. 3, the actual volume performance level management table 22 is composed of a "Volume Number" field 50 and a "Actual Volume Performance Level" field 51. Of these fields, the "Volume Number" field 50 stores the respective volume numbers of all the volumes VOL established in the tiered storage apparatus 4 and in the external storage apparatuses 6.

Also, the "Actual Volume Performance Level" field 51 stores the corresponding actual volume performance levels of the respective volumes VOL. This actual volume performance level is calculated according to the following formula.

$$La = Ca1 \times Ea1 + Ca2 \times Ea2 + \ldots + Can \times Ean \quad (2)$$

In the above formula, $Ea1, Ea2, Ean$ are respective values concerning specific items (hereinafter referred to as actual performance level calculation factors), that are obtained using the operation information for a relevant volume VOL, from the operational information for each volume VOL sent from the tiered storage apparatus 4, and $Ca1, Ca2 \ldots, Can$ are weighted values for adjusting variation between the respective actual performance level calculation factors, which are normally all set as "1." If any of the values obtained according to the operational information for each volume VOL sent from the tiered storage apparatus 4 is a value where, normally, the smaller the value is, the better the performance is, the inverse number of that obtained value is used for calculating formula (2).

Figure 4:
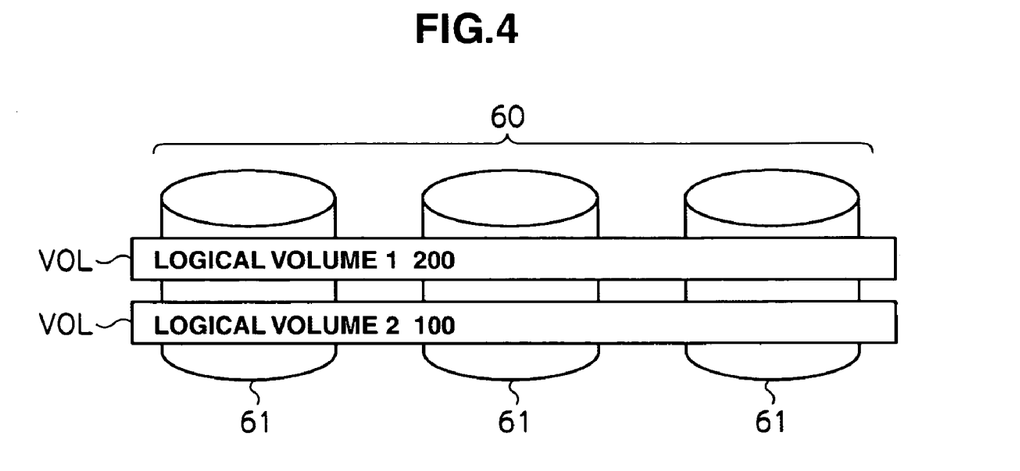
FIG. 4 is a schematic diagram for explaining a theoretical remaining number of maximum inputs/outputs.

Examples of the actual performance level calculation factors include rotations per second of the disk devices providing a relevant volume VOL, the time required to respond to a data input/output request, and a theoretical remaining number of maximum inputs/outputs. The theoretical remaining number of maximum inputs/outputs is only used for the case where, as shown in FIG. 4, more than one volume VOL is established on the storage area provided by plural disk devices 61 constituting a RAID group 60. This number can be obtained as the theoretical number of maximum inputs/outputs per unit time acceptable for the RAID group 60, minus the statistical number of data inputs/outputs per unit time in the currently used portions of the respective volumes VOL established on that storage area.

For example, as shown in FIG. 4, if the RAID group 60 is composed of three disk devices 61, each having 1,000 rotations per second, and a first volume VOL ("logical volume 1") accepting 200 data inputs/outputs per second and a second volume VOL ("logical volume 2") accepting 100 data inputs/outputs per second are established on the storage area provided by this RAID group 60, the theoretical remaining number of maximum inputs/outputs N is calculated as shown in the following formula:

$$N=\{1000 \times 3-(200+100)\}/3=900 \text{ (inputs/outputs)} \quad (3)$$

Figure 5:
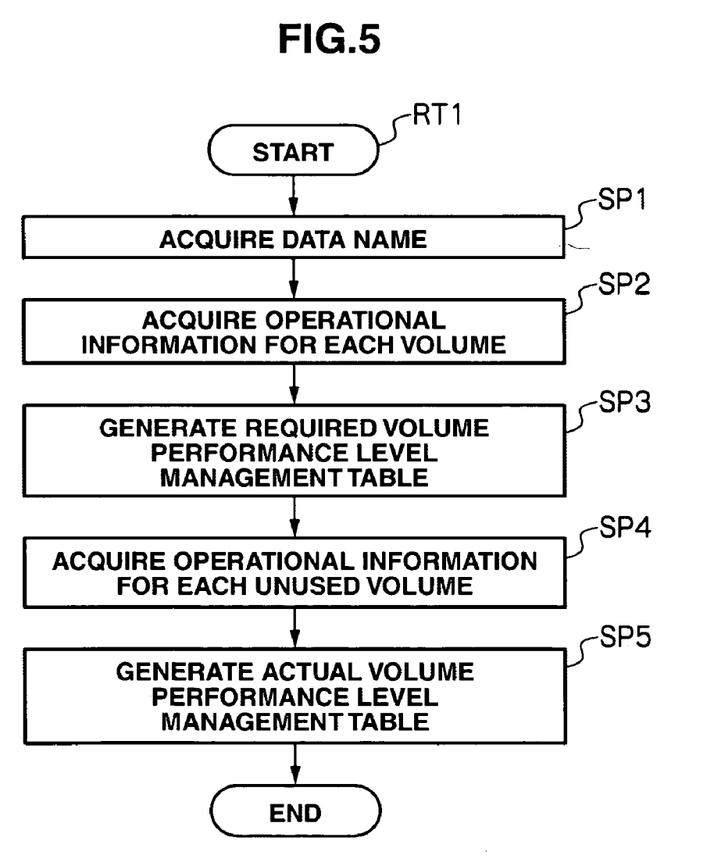
FIG. 5 is a flowchart for a table generation process.

FIG. 5 is a flowchart showing the process for generating the above-described required volume performance level management table 21 (FIG. 2) and actual volume performance level management table 22 (FIG. 3). According to the operational information for each volume VOL sent from the tiered storage apparatus 4, and the table generation program 12 stored in the memory 11 (both shown in FIG. 1), the CPU 10 of the management host 3 (FIG. 1) follows the table generation process RT 1 to generate the required volume performance level management table 21 and the actual volume performance level management table 22.

Specifically, the CPU 10 performs this table generation process RT1 at certain time intervals, and first obtains the data names for all respective data stored in the volumes VOL in the tiered storage apparatus 4 (and in the virtualized volumes VOL in the external storage apparatuses 6 as well), and the application names of all the corresponding applications (SP1).

More specifically, the CPU 10 queries in advance each operation host 2 for the names of the applications that run on that operation host 2 and use any of the volumes VOL in the tiered storage apparatus 4 (and the virtualized volumes VOL in the external storage apparatuses 6), together with the data names for the respective data stored in the volumes VOL used by those applications, and stores the so obtained application names and data names in a certain table not shown in the drawings (hereinafter referred to as an application names, etc., management table) to manage them.

Then, in step SP1 of the table generation process RT1, the CPU 10 searches the above-mentioned application names, etc., management table, and obtains the names of all the respective data stored in the volumes VOL in the tiered storage apparatus 4, and the names of all the corresponding applications.

The CPU 10 next issues to the tiered storage apparatus 4 a request for transfer of the operational information for each volume VOL (hereinafter referred to as a volume operational information transfer request), in accordance with the operational information acquisition program 13 (FIG. 1). Then, in response to that volume operational information transfer request, the controller 31 in the tiered storage apparatus 4 queries the corresponding external storage apparatuses 6 for the virtualized volumes VOL, and reads the stored information for the non-virtualized volumes VOL established in its own storage apparatus, to acquire the operational information for each volume VOL obtained via the conventional techniques, and send it to the management host 3. As a result, the CPU 10 acquires the operational information for each volume VOL (SP2).

After that, the CPU 10 calculates the required volume performance level for the respective data in above-described manner, based on the operational information for each volume VOL acquired as above. The CPU 10 then generates the required volume performance level management table 22 using the calculation results and stores it in the local disk device 20 (SP3).

After that, the CPU 10 extracts necessary information from the operational information for each volume VOL sent from the tiered storage apparatus 4 (SP4), and using the extracted information, calculates the actual volume performance level for each volume VOL in the above-described manner. The CPU 10 then generates the actual volume performance level management table 21 using the calculation results and stores it in the local disk device 20 (SP5).

When the CPU 10 generates the required volume performance level management table 21 and stores it in the local disk device 20 (SP3), the CPU 10 also records information about the relevance of the data. Specifically, the CPU 10 determines that different data managed by the same application (but stored in different volumes) has relevance, and stores that information (hereinafter referred to as "data relevance information") in the local disk device 20, associating it with the required volume performance level management table 21.

Figure 6:
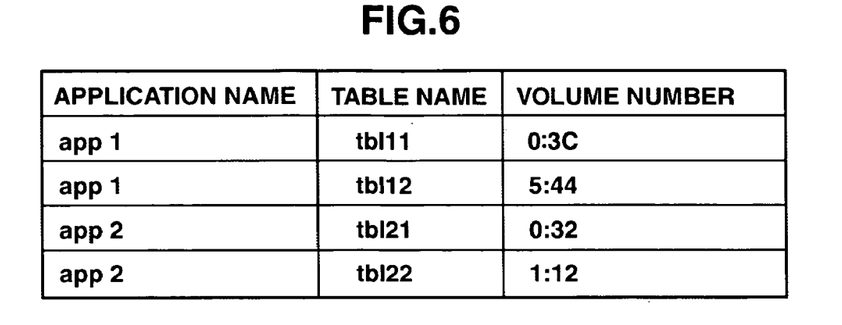
FIG. 6 is a schematic diagram for explaining data relevance information.

The above data relevance can immediately be detected if there is an initial setting to associate an application with the volumes VOL storing data managed by that application. For example, if applications are associated with their used volumes VOL in advance as shown in FIG. 6, it can be determined that the data stored in the volume VOL with the volume number "0:3C" and the data stored in the volume VOL with the volume number "5:44" have relevance as both volumes are being used by the application "app1," and the data stored in the volume VOL with the volume number "0:32" and the data stored in the volume VOL with the volume number "1:12" have relevance as both volumes are being used by the application "app2."

So, after generating the required volume performance level management table 21, the CPU 10 queries each operation host 2 about whether the host has any setting for associating an application with a volume(s) VOL, and if the host has a setting that associates one application with several volumes VOL, the CPU 10 stores data relevance information indicating that the respective data stored in those volumes VOL has relevance, in the local disk device 20.

Furthermore, for example, if an application has a scheduled access pattern such as one like sequentially accessing (data in) several volumes, to execute a certain processing, the CPU 10 can detect relevant data by obtaining that schedule information.

Figure 7:
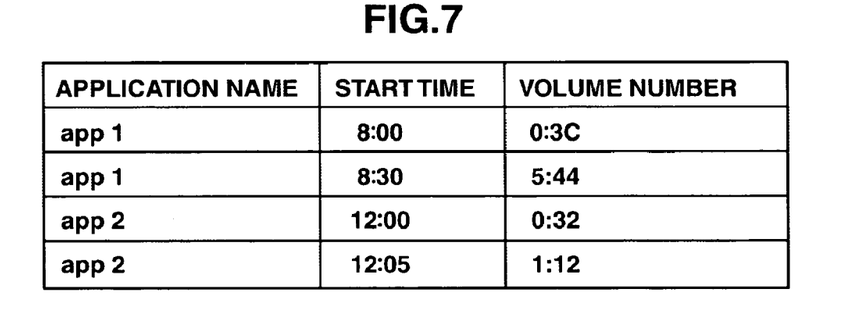
FIG. 7 is a schematic diagram for explaining data relevance information.

For example, if schedules are established as shown in FIG. 7, that shows that the application "app1" accesses the volume VOL with volume number "0:3C" at the time "8:00" and then accesses the volume VOL with volume number "5:44" at the time "8:30," so it can be determined that the respective data stored in these two volumes VOL has relevance. The above also shows that the application "app2" accesses the volume VOL with volume number "0:32" at the time "12:00" and then accesses the volume VOL with volume number "1:22" at the time "12:05," so it can be determined that the respective data stored in these two volumes VOL has relevance.

So, after generating the required volume performance level management table 21, the CPU 10 queries each operation host 2 about whether there is any schedule setting for an application involving the application's access pattern to the corresponding volumes VOL, and if there is such schedule setting, the CPU 10 stores data relevance information indicating that the respective data stored in those corresponding volumes VOL has relevance, in the local disk device 20.

Figure 8:
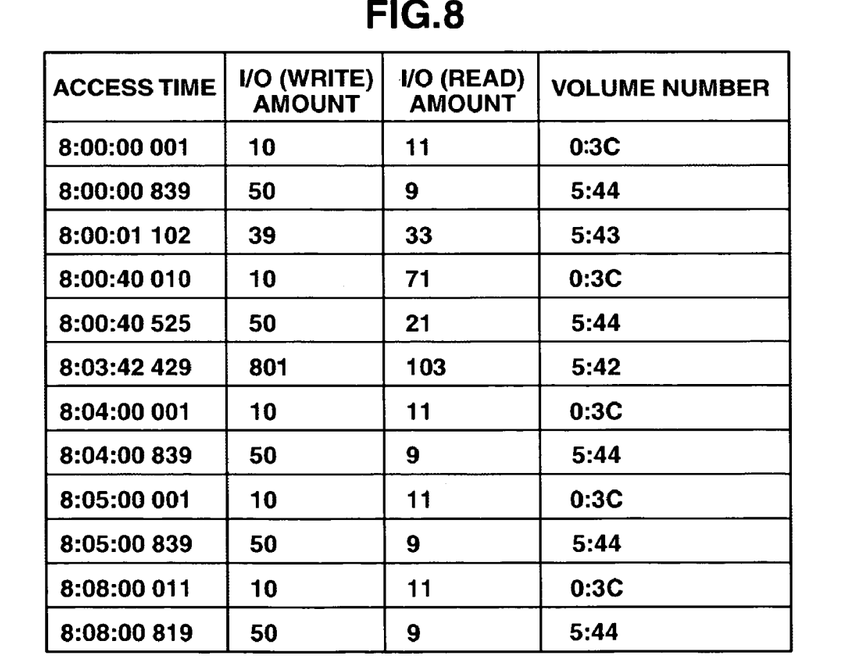
FIG. 8 is a schematic diagram for explaining data relevance information.

Moreover, data relevance can also be detected statistically from access patterns to each volume VOL. For example, if access patterns to each volume VOL are observed as shown in FIG. 8, this observation result indicates that one access pattern where the volume VOL with the volume number "5:44" is accessed within one second after the volume VOL with the volume number "0:3C" is accessed has occurred as many as five times in a short time. This implies a certain application sequentially accessing the volumes VOL with the numbers "0:3C" and "5:44" to execute certain processing. Accordingly, the respective data stored in these two volumes VOL can be determined as having relevance.

So, after generating the required volume performance level management table 21, the CPU 10 issues to the tiered storage apparatus 4 a transfer request for the statistical information about accesses to volumes (hereinafter referred to as volume access statistical information).

In this case, the controller 31 in the tiered storage apparatus 4 keeps the statistical information, such as when and what volumes VOL are accessed, and what amount of data is read/written during those accesses (write data amount (I/O (write) amount) and read data amount (I/O (read) amount)), for example, for the last one hour. Then, when receiving the above-mentioned transfer request for volume access log information, the controller 31 sends to the management host 3 the statistical information for the last one hour kept as above, as the volume access statistical information.

Figure 9:
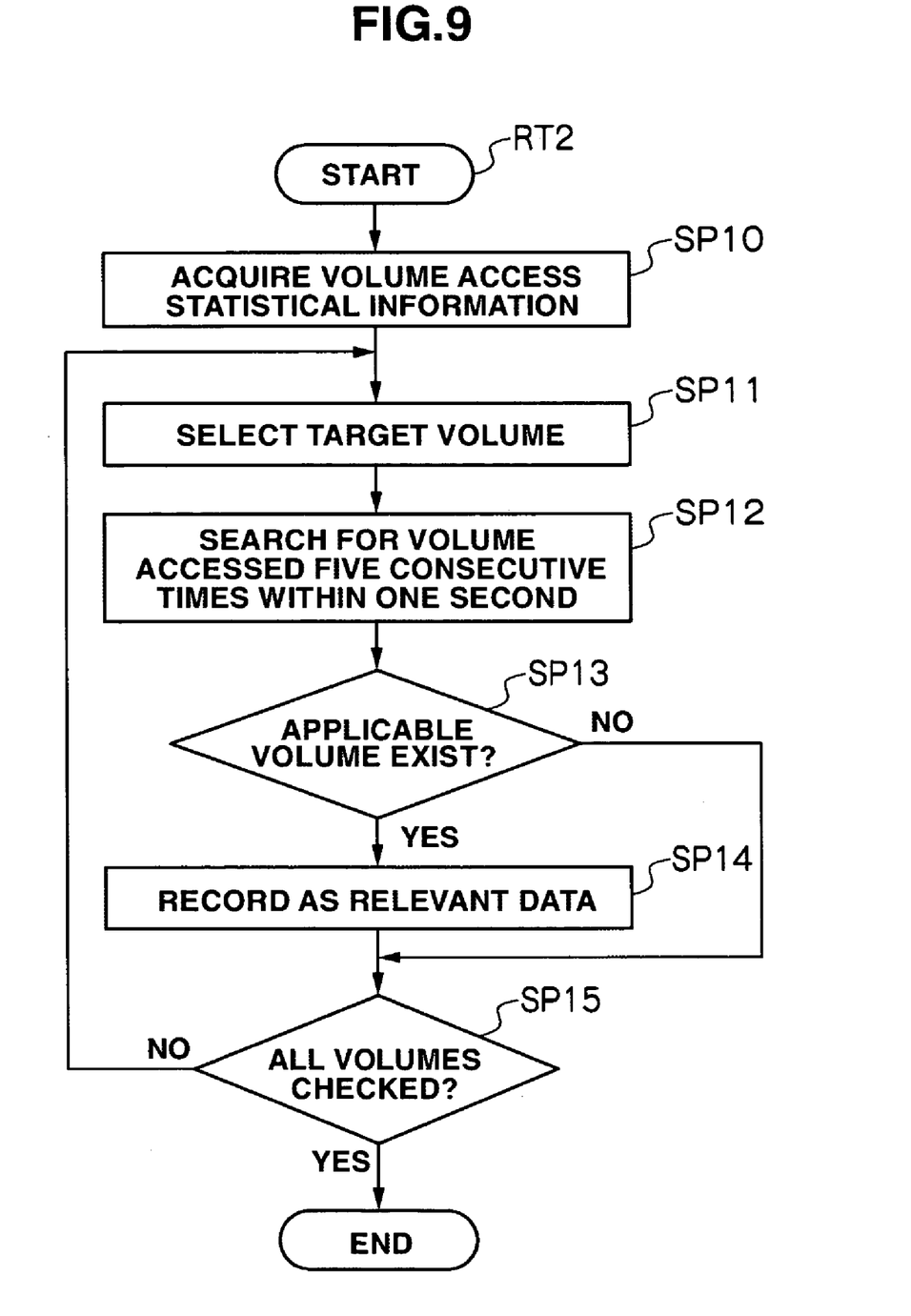
FIG. 9 is a flowchart for a relevant data detection process.

According to the above log information, and the table generation program 12 (FIG. 1), the CPU in the management host 3 then follows the relevant data detection process RT2 shown in FIG. 9 to perform processing to detect relevant data.

In other words, when the CPU 10 goes to step SP3 in the above-described table generation process RT1 shown in FIG. 5, it generates the required volume performance level management table 21, and concurrently starts the relevant data detection process RT2, issues a transfer request for the volume access statistical information to the tiered storage apparatus 4, and thereby obtains that volume access statistical information (SP10).

The CPU then refers to the volume access statistical information and randomly selects a volume that is considered as having received data inputs/outputs (hereinafter referred to as a target volume) (SP11), and searches for any volume that has been accessed more than five consecutive times in a pattern of being accessed within one second after the target volume VOL is accessed (SP12).

The CPU 10 then judges whether there is any such volume VOL (SP13). If it gets a negative result in this judgment (SP13: NO), it goes to step SP15, while if it gets an affirmative result (SP13: YES), it determines that the data stored in that volume VOL is relevant with the data stored in the target volume VOL and records that data relevance information in the local disk device 20 (SP14).

After that, referring to the volume access statistical information, the CPU 10 judges whether the same steps (SP 11 through SP14) have been performed with respect to all the volumes VOL that are considered to have received any data inputs/outputs (SP15). If it gets a negative result (SP15: NO), it performs the same steps for the remaining volumes VOL considered as having received inputs/outputs. When the CPU 10 finally gets an affirmative judgment result in step SP15 (SP15: YES), it ends this relevant data detection process.

Figure 10:
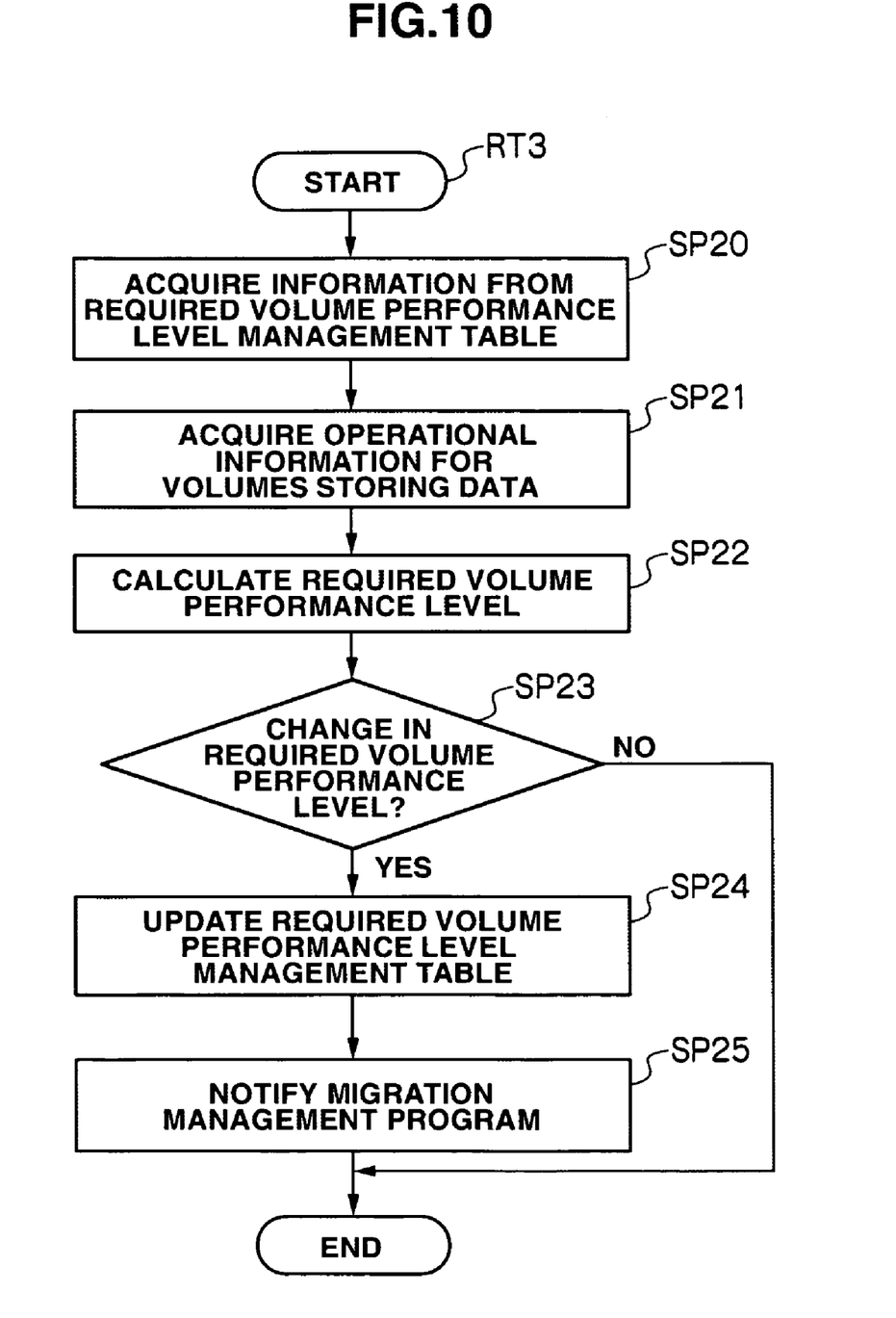
FIG. 10 is a flowchart for a required level monitoring process.

Thereafter, in accordance with the required level monitoring program 14 (FIG. 1), the CPU 10 of the management host 3 follows the required level monitoring process RT3 as shown in FIG. 10 to monitor the change in the required volume performance level for respective data.

More specifically, when the above-described table generation process RT1 shown in FIG. 5 has been completed, the CPU 10 thereafter performs the required level monitoring process RT3 at certain time intervals (for example, every one hour), and in accordance with the operational information acquisition program 13 (FIG. 1), the CPU 10 firstly issues a volume operational information transfer request to the tiered storage apparatus 4 and thereby obtains the operational information for each volume VOL (SP20).

The CPU 10 then extracts from the obtained operational information for each volume VOL the corresponding operational information for the respective volumes that store data (i.e., volumes used by applications) (SP21), and then, based on that extracted operational information, calculates the required volume performance level for the respective volumes VOL used as a storage area for data (SP22). In this explanation, since it is assumed that one volume VOL stores one kind of data, the above-calculated required volume performance level for the respective volumes VOL constitutes the required volume performance level for the corresponding data stored in the respective volumes VOL.

Then, the CPU 10 compares the above-calculated required volume performance levels respectively with the corresponding required volume performance levels stored in the required volume performance level management table 21, and judges whether there is a change in any of the required volume performance levels (SP23).

If the CPU 10 gets a negative result in the above judgment (SP23: NO), it ends this required level monitoring process, while if it gets an affirmative result (SP23: YES), it amends the corresponding entry's value stored in the "Required Level" fields 43 (FIG. 2) of the required volume performance level management table 21 to the present required volume performance level value that has been calculated in step SP22 (SP24).

Furthermore, the CPU thereafter initiates the migration management program 15 (FIG. 1), and sends to this migration management program 15 a notice that below-explained migration management processing should be performed, along with a record of the volume numbers of the volumes VOL storing any data with changes in their required volume performance level (hereinafter referred to as a migration management processing execution notice) (SP25). The CPU 10 then ends this required level monitoring process.

Figure 11:
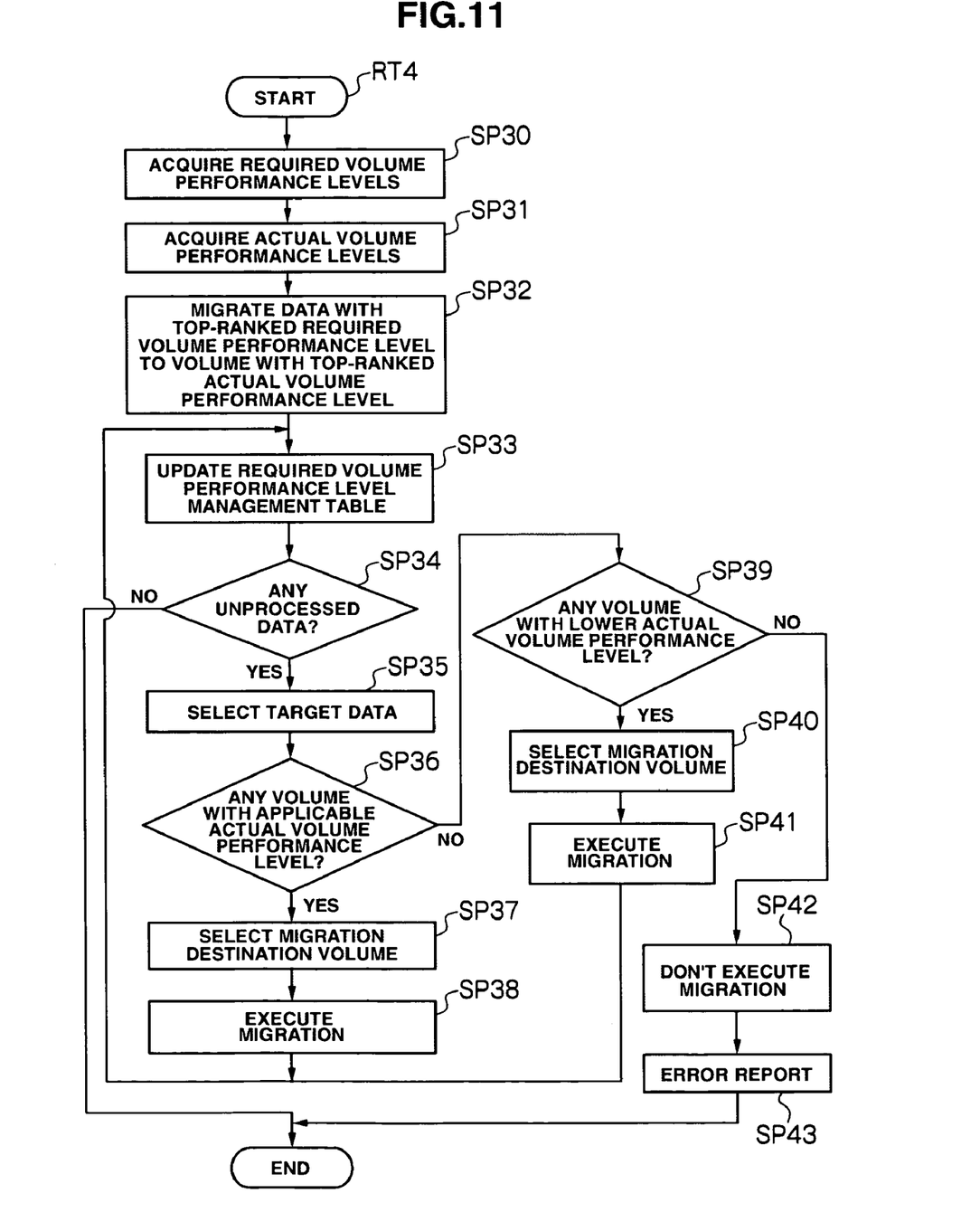
FIG. 11 is a flowchart for a migration management process.

Meanwhile, the CPU 10, if it updates the required volume performance level management table 21 as stated above, follows the migration management process RT4 as shown in FIG. 11 to migrate the data with changes in their required volume performance level and any data relevant thereto from the present volumes VOL to other volumes VOL, in accordance with the migration management program 15 (FIG. 1). The CPU 10 controls this migration in a manner where data having a higher required volume performance level are migrated to a migration target volume VOL having a higher actual volume performance level.

More specifically, the CPU 10 starts the migration management processing upon the receipt of a migration management processing execution notice from the required level monitoring program 14, and the CPU 10 first reads the respective present required volume performance levels of the migration target data (data having changes in their required volume performance level and any data relevant thereto) from the required volume performance level management table 21, based on the volume numbers of the volumes VOL that are indicated in the above migration management processing execution notice as volumes storing data having changes in their required volume performance level, and also based on the data relevance information stored in the local disk device 20 (SP30).

The CPU 10 then finds volumes storing no data (hereinafter referred to as unused volumes) amongst the volumes VOL established in the tiered storage apparatus 4 and in the external storage apparatuses 6, and reads the actual volume performance levels of those unused volumes from the actual volume performance level management table 22 (SP31).

The CPU 10 next migrates the data having the top-ranked required volume performance level in the migration target data to an unused volume VOL having the top-ranked actual volume performance level in the unused volumes VOL that have the same or a larger capacity compared to that of the present volume VOL. Furthermore, incidental to the above, the CPU 10 performs various processing such as updating a data management table (not shown) for managing the location where respective data are stored (SP32).

In the below explanation, the "migration processing" means a series of processes for migrating data, including the above-described data migration processing itself and various processing incidental to that data migration. Also, the "top-ranked required volume performance level" means the required volume performance level for specific data having the highest required volume performance level in the respective migration target data, and the "top-ranked actual volume performance level" means the actual volume performance level for an unused volume VOL having the highest actual volume performance level.

In response to the above data migration, the CPU 10 then updates the required volume performance level management table 21 (SP33). Specifically, the CPU 10 rewrites the corresponding entry's volume number stored in the "Used Volume" field 44 in the required volume performance level management table 21, to the volume number of a new volume VOL after that migration.

After that, the CPU 10 judges whether there are any migration target data that have not yet been migrated (SP34). If the CPU 10 gets a negative result in this judgment (SP34: NO), it ends this migration management processing.

If the CPU 10 gets an affirmative result in the above judgment (SP34: YES), it selects data having the highest required volume performance level in the remaining migration target data that have not yet been migration-processed (SP35).

The CPU 10 then judges whether there is a volume VOL that can be a migration target volume for that selected data, based on the actual volume performance level management table 22 (SP36).

Specifically, the CPU 10 first calculates the relative value of that selected data's required volume performance level based on assuming a value of "100" to the top-ranked required volume performance level (hereinafter referred to as a relative required volume performance level). For example, if the top-ranked required volume performance level is 120, and the selected migration target data has a required volume performance level of 60, the relative required volume performance level Lr' of that data is calculated as "50," as shown in the below formula.

$$Lr' = (60 \times 100)/120 = 50 \tag{4}$$

Concurrently with the above calculation, the CPU 10 also calculates the relative value of each unused volume VOL's actual volume performance level recorded in the actual volume performance level management table 22 based on assuming a value of "100" to the top-ranked actual volume performance level (hereinafter referred to as a relative actual volume performance level). For example, if the top-ranked actual volume performance level is 80, and a specific unused volume VOL has a actual volume performance level of 50, the relative actual volume performance level La' of that unused volume VOL is calculated as "62.5," as shown in the below formula.

$$La' = (50 \times 100)/80 = 62.5 \tag{5}$$

Then, the CPU 10 judges whether there is any unused volume VOL that has a relative actual volume performance level higher than the relative required volume performance level for the selected migration target data calculated in the above manner, that also has the same or a larger capacity compared to that of the volume VOL currently storing that selected data (SP36).

If the CPU 10 gets an affirmative result in this judgment (SP36: YES), it selects, as the migration target volume VOL for that selected data, one from the unused volume(s) VOL that have a relative actual volume performance level higher than the relative required volume performance level for the selected migration target data, that also have the same or a larger capacity compared to that of the volume VOL currently storing that selected data (SP37).

At that time, if there are several unused volumes VOL satisfying the above criteria, the CPU 10 selects the one having the highest relative actual volume performance level as the migration target volume VOL. Moreover, if there are several such unused volumes VOL having the [same] highest relative actual volume performance level, the CPU 10 selects the volume VOL provided by disk devices having the smallest device number as the migration target volume VOL.

The CPU 10 thereafter performs the processing for migrating that selected migration target data to the unused volume VOL selected in step SP37 (SP38), and then returns to step SP33, updating the required volume performance level management table 21 and the actual volume performance level management table 22 (SP33). The CPU 10 further repeats the same steps for the other migration target data.

Meanwhile, if the CPU 10 gets a negative result in the judgment in step SP36 (SP36: NO), it judges whether there is any unused volume VOL that has a relative actual volume performance level lower than the relative required volume performance level for the selected migration target data, that also has the same or a larger capacity compared to that of the volume VOL storing the selected migration target data (SP39).

If the CPU 10 gets an affirmative result in this judgment (SP39: YES), it selects one of the unused volume(s) VOL satisfying the above criteria as the migration target volume VOL for the selected target data (SP40). At that time, if there are several unused volumes VOL satisfying the above criteria, the CPU 10 selects the one having the highest relative actual volume performance level as the migration target volume VOL. Moreover, if there are several such unused volumes VOL having the [same] highest relative actual volume performance level, the CPU 10 selects the volume VOL provided by disk devices having the smallest device number as the migration target volume VOL.

The CPU 10 thereafter performs the processing for migrating that selected migration target data to the unused volume VOL selected as above (SP41), and then returns to step SP33, updating the required volume performance level management table 21 (SP33). The CPU 10 further repeats the same steps for the other migration target data.

Meanwhile, if the CPU 10 has a negative result in the judgment in step SP39 (SP39: NO), it decides not to perform any migration processing for that data (SP42), indicates an error notice based on that decision on a display and/or transmits an error report to the relevant administrator (SP43), and then ends the migration management processing.

(3) Effect of this Embodiment

According to the above-explained configuration, the management host manages the required volume performance level for respective application data and the actual volume performance level for respective volumes VOL. The management host also monitors the respective data's required volume performance level, and if it finds a change in the required volume performance level in any of the data, it migrates the data having the change in its required volume performance level and any data relevant thereto, with data with a higher required volume performance level (relative required volume performance level) being migrated to an unused volume VOL with a higher actual volume performance level (relative actual volume performance level).

Accordingly, in the storage system 1, even after the data migration management processing, mutually relevant data can keep their correlation of data with a higher required volume performance level being stored in a volume VOL with a higher actual volume performance level, and thus, it is possible to perform most suitable data migration, with the correlation between data managed by particular applications being taken into account.

(4) Other Embodiments

The above-described embodiment explains the case where this invention is applied to a storage system 1 configured as in FIG. 1. However, this invention is not limited to this, and can be widely applied to other storage systems with various different configurations.

Figure 12:
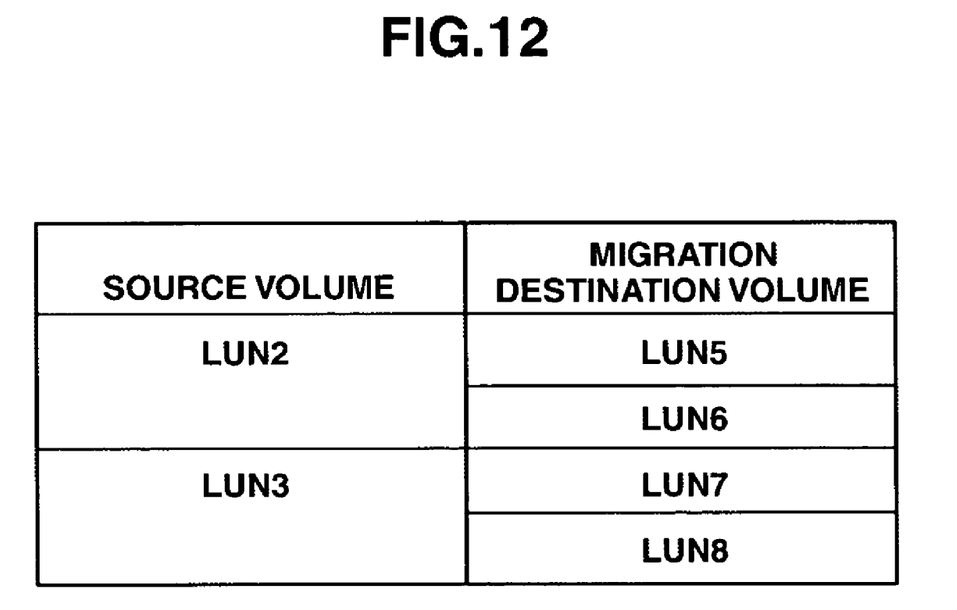
FIG. 12 is a schematic diagram for explaining another embodiment.

The above embodiment explains the case where in the migration management processing described in FIG. 11, the management host 3 selects and designates, from start to finish, unused volumes VOL as the migration target volumes for the migration target data (data having changes in their required volume performance level and any data relevant thereto), and migrates those migration target data to appropriate unused volumes VOL. However, this invention is not limited to this, and a configuration is possible where with respect to a part or the whole of the migration target data, possible choices for their migration target volumes VOL are visually displayed on a display or similar of the management host 3, for example, as shown in FIG. 12, based on the calculated required volume performance level (or relative required volume performance level) for the respective migration target data and the calculated actual volume performance level (or relative actual volume performance level) for the respective unused volumes VOL, so that a user (administrator) can freely select one from the displayed choices as the migration target volume. Note that the display example shown in FIG. 12 is one where after a specific unused volume VOL has been designated as the migration target volume for the data having the top-ranked required volume performance level, possible unused volume choices for the migration target volumes VOL are displayed with respect to their relevant data.

Furthermore, the above embodiment explains the case where the targets of the migration management processing explained in FIG. 11 are limited to the data having changes in their required volume performance level and any data relevant thereto. However, this invention is not limited to this, and it is possible to target all the data stored in the respective volumes VOL. In this case, data migration for mutually relevant data should be configured to be performed, with data with a higher required volume performance level being migrated to a volume VOL with a higher actual volume performance level.

Still furthermore, the above embodiment explains the case where the migration management processing explained in FIG. 11 is performed if any change has occurred in the required volume performance level for certain data stored in any of the volumes VOL. However, this invention is not limited to this, and it is possible to perform the same migration management processing at other timing, for example, when a new external storage apparatus 6 is connected to the tiered storage apparatus 4. In this case, all data managed by the respective applications at that time are the targets of the migration management processing.

The present invention can be broadly applied to storage systems with various configurations.

What is claimed is:

1. A storage system with a storage apparatus having a plurality of volumes for storing data, and a management apparatus managing the storage apparatus, comprising:

the storage apparatus including a controller for collecting updated operational information at predetermined time intervals, for each of the volumes, and sending that operational information to the management apparatus; and the management apparatus including a control unit for determining a migration target volume when data migration is executed from a migration source volume to the migration target volume, based on relevance between the migration source volume and the migration target volume, and controlling the storage apparatus, in a manner where any target data of the data, that is a migration target, is respectively migrated to another of the volumes, based on the updated operational information for each of the volumes;

wherein the control unit in the management apparatus respectively calculating a required volume performance level that is a level of performance required of the volume currently storing the target data that is a migration target, and also each of actual volume performance levels that is an updated level of performance for each of the volumes, respectively, established in the storage apparatus, based on the updated operational information for each of the volumes, and in accordance with the calculated required volume performance level and each of the actual volume performance levels, migrating the target data that is a migration target to another of the volumes having the actual volume performance level corresponding to the required volume performance level of the volume currently storing the target data, wherein the control unit in the management apparatus respectively calculates a relative required volume performance level that is a relative value for the required volume performance level between any of the target data that is a management target, and also respectively calculates a relative actual volume performance level that is a relative value for the actual volume performance level of each of the volumes, and controls the storage apparatus in a manner where a target data having a higher relative required volume performance level is migrated to a volume having a higher relative actual volume performance level, the relative value for the relative actual volume performance level is calculated by normalizing the actual volume performance level with a maximum value of the actual volume performance level as a maximum predetermined value.

2. The storage system according to claim 1, wherein the control unit in the management apparatus first selects, as a volume that is a migration destination, a volume having the relative actual volume performance level higher than the relative required volume performance level of the volume storing the target data that is a migration target, and if there is no such volume, the control unit in the management apparatus selects a volume having the relative actual volume performance level lower than the relative required volume performance level of the volume storing the target data that is a migration target.

3. A method for migrating target data between a plurality of volumes storing data, comprising:
collecting updated operational information at predetermined time intervals, for each of the volumes;
respectively calculating a required volume performance level that is a level of performance required of a volume currently storing target data that is migration target, and calculating an actual volume performance level that is an updated level of performance for each of the volumes established in a storage apparatus, based on the updated operational information for each of the volumes;
in accordance with the calculated required volume performance level and each of the actual volume performance levels, determining a migration target volume when data migration is executed from a migration source volume to the migration target volume, based on relevance between the migration source volume and the migration target volume, and migrating the target data that is a migration target to another of the volumes having an actual volume performance level corresponding to the required volume performance level of the volume currently storing the target data,
wherein the migrating includes respectively calculating a relative required volume performance level that is a relative value for the required volume performance level between any of the target data that is a migration target, and also respectively calculating a relative actual volume performance level that is a relative value for the actual volume performance level of each of the volumes, and controlling the storage apparatus in a manner whereby the target data having higher relative required volume performance level is migrated to a volume having a higher relative actual volume performance level, a relative value for the relative actual volume performance level is calculated by normalizing the actual volume performance level with a maximum value of the actual volume performance level as a maximum predetermined value.

4. The method according to claim 3, wherein the volume having the relative actual volume performance level higher than the relative required volume performance level of the volume storing the target data that is a migration target, is selected first as a volume that is a migration destination, and if there is no such volume, the volume having the relative actual volume performance level lower than the relative required volume performance level of the volume storing the target data that is a migration target is selected.

* * * * *